(No Model.)
G. G. BUCKLAND.
Vehicle Spring.
No. 238,847. Patented March 15, 1881.
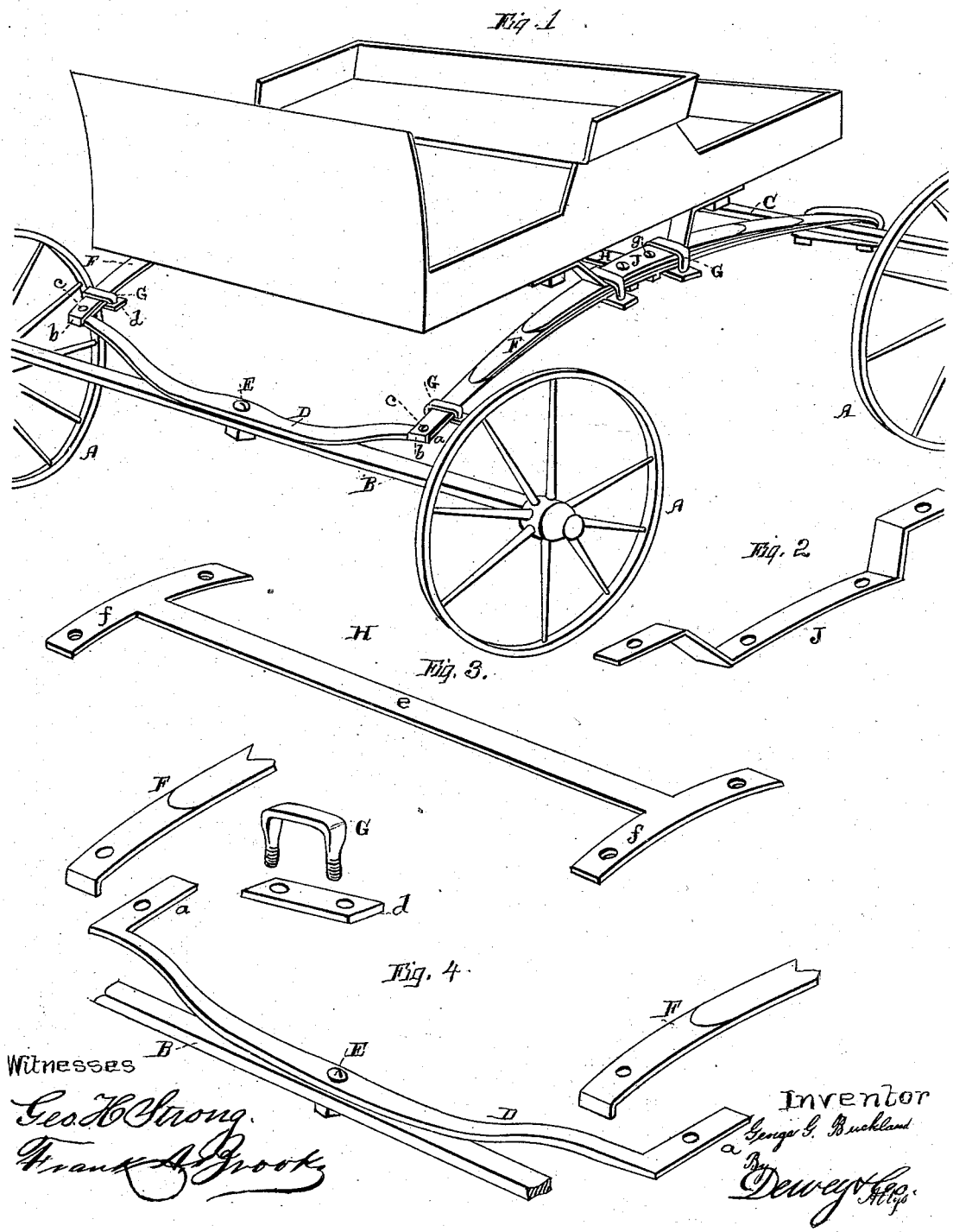

UNITED STATES PATENT OFFICE.

GEORGE G. BUCKLAND, OF TULARE, CALIFORNIA.

VEHICLE-SPRING.

SPECIFICATION forming part of Letters Patent No. 238,847, dated March 15, 1881.

Application filed December 11, 1880. (No model.)

*To all whom it may concern:*

Be it known that I, GEORGE G. BUCKLAND, of the city and county of Tulare, State of California, have invented an Improvement in Vehicles; and I hereby declare the following to be a full, clear, and exact description thereof.

My invention relates to certain improvements in vehicles; and it consists in certain details of construction of the running-gear, as hereinafter fully described and claimed.

The object of my invention is to save work and material by simplifying the construction in using no wood for the head-block, nor perches, nor the many irons about the perches and head-block in ordinary vehicles, and in providing a better gearing than is now in use.

Referring to the accompanying drawings, Figure 1 is a view of a buggy showing my invention. Fig. 2 is a view of the support for the body of the vehicle. Fig. 3 shows the cross-frame. Fig. 4 shows the axle and bolster, with a portion of the spring separated.

Let A represent the wheels of a vehicle, B the front axle, and C the rear axle.
The head-block or bolster is represented by D, and is formed of a flat piece of iron turned up and back, forming the rearwardly-projecting ends *a a*. It is pivoted to the front axle, B, by the king-bolt E. This construction of the head-block affords strength with lightness, and permits the springs to be fastened to it in the manner hereinafter shown, affording good support for the ends of the springs and keeping the gearing square.
The springs F are formed of as many leaves as desirable, the under leaf being turned downward at both ends to form the catch or clasp *b*. When the springs are constructed in any other way than the leaf-spring the ends are bent over in the same way. The catches *b* on the forward ends of the springs fit over the bolster or head-block D, the lower leaf lying upon the ends *a a*. The pivots *c* secure the spring to the ends *a a*, the clips G further assisting. The clips G are set transversely across the spring, and embrace both the spring and the ends *a a* of the head-block, and are fastened by the plates *d*, passing underneath and fitting over the ends of the clips, and are secured by nuts, as shown. The rear ends of the springs fit their catches *b* over the rear axle, C, which is made wide and flat to give the leaf of the spring a better support. Similar clips, G, fasten the springs to the rear axle, but are attached diagonally, as shown, being secured by a plate and nut, as already described. This completes the connection between the axles and constitutes the running-gear. The advantages of thus securing the springs directly to the axles is, that I dispense with the bolts by which the springs now in use are attached to the axles, and on which they revolve.

In my construction the springs obtain firm hold by reason of the flat ends of the head-block and the flat rear axle, which are griped by the catches *b*, further security being obtained by the use of my clips. Thus the entire gear is kept square. Attaching the springs directly in this manner causes them, when pressed down, to turn the axles and force them farther apart, the wheels allowing them to do this, thus giving much more spring than if attached in the usual way.

H represents my cross-frame, consisting of the single connecting bar or shank *e* and the ends *f*. These ends are the same width as the springs, and fit under them at their middle.

J shows the support for the body of the vehicle. It is made of flat strips of iron of the same width as the springs, and is laid upon the top of the springs. The cross-frame and supports J are both fastened to the springs by the bolts or rivets *g*, two on each side, and secured by nuts underneath, as shown. Clips G, constructed in the same manner as those which fasten the ends of the springs, fit over the supports J, springs F, and cross-frame H, thus binding them tightly together.

The cross-frame H, in being simple, is less likely to get out of order, and its shape is such as to allow a springing motion whenever, by reason of an irregularity in the road, one wheel of the vehicle drops below a level, and returns to its position when the irregularity is passed. It braces the gear and keeps it square, and can accommodate itself to any position in which the vehicle may be put, because of its springy character.

My manner of attaching the springs dispenses with all joints, and all the connections being solid, there is no wear, or rattling, or jolting, or tilting sidewise, because they permit the body of the vehicle to spring down squarely, the whole springy motion being the result not only of the springs themselves, but the further yielding of the axles, as the wheels allow them to separate. The head-block D assists the cross-frame H in keeping the gear square, because its shape, with its turned-back ends, presents a good support for the springs, which lie squarely upon it.

I am aware that springs have heretofore been used which connect the axles and dispense with other connections; but in all such cases the springs are connected with the axles by bolts, on which they revolve, and have consequently no other spring than that which their own nature imparts. Being thus connected, they are less firm and square, and any great strain on one side would be apt to break or twist the bolt, so that the gear is not kept perfectly square, as it should be; but my invention obviates this difficulty. I do not claim that it consists in the side springs, by which I dispense with perches and other connections. It consists in the manner and the means by which I attach the springs to the axle, head-block, and cross-frame, and the peculiar shape of the head-block, spring, and cross-frame, by which I impart to the springs an action beyond their construction in forcing the wheels to assist their purpose, and at the same time to give a firm square support for the gearing.

Having thus described my invention, what I claim as new, and desire to secure by Letters Patent, is—

1. In the running-gear of vehicles, the head-block or bolster D, having the turned-back flat ends $a\ a$, for supporting the springs, substantially as herein described.

2. The combination of the head-block D, with its turned-back ends $a\ a$, and the springs F, with their catches $b$, for holding the head-block D, said springs lying upon the flat ends $a\ a$ of the head-block, and secured thereto by the rivets $c$ and the clips G, substantially as and for the purpose herein described.

3. The running-gear for vehicles, consisting of the springs F, with their ends provided with catches or clasps $b$, fitting over the head-block D and the rear axle, C, and secured thereto by the clips G, and the head-block D, with its turned-back ends $a\ a$, supporting the springs F, and the cross-frame H, secured to the springs by the clips G, the whole forming a firm and square running-gear, substantially as herein described.

In witness whereof I have hereunto set my hand.

GEORGE GARDNER BUCKLAND.

Witnesses:
WM. CARPENTER,
DANIEL MCDONALD.